May 13, 1941.   A. W. BATEMAN ET AL   2,241,384
STERILIZABLE ADHESIVE TAPE
Filed Aug. 1, 1939
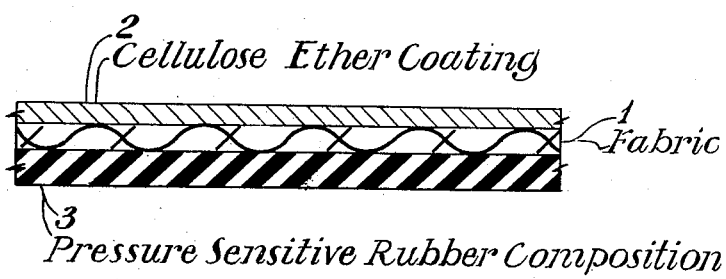
Alva W. Bateman
Raymond E. Thomas   INVENTORS
BY
Frank C. Hilberg   ATTORNEY Patented May 13, 1941

2,241,384

UNITED STATES PATENT OFFICE 2,241,384

STERILIZABLE ADHESIVE TAPE

Alva W. Bateman and Raymond E. Thomas, Newburgh, N. Y., assignors to E. I. du Pont de Nemours & Company, Wilmington, Del., a corporation of Delaware Application August 1, 1939, Serial No. 287,708

6 Claims. (Cl. 91—68)

This invention relates to adhesive tape, and more particularly to cleanable backing for adhesive tape and still more particularly to a sterilizable cleanable backing for adhesive tape for medical and surgical use.

In United States Patent 2,118,101 issued May 24, 1938, there is disclosed an adhesive tape material consisting of a woven cotton fabric having on one side a cellulose nitrate coating and on the other side a pressure-sensitive rubber adhesive mass. Adhesive tapes of this character are superior to the untreated fabric, having only a pressure-sensitive rubber adhesive mass on one side, in that they are cleanable.

For surgical use it is desirable to use sterile adhesive tape. In practice the adhesive tape may be made sterile by subjecting it to steam at 240° F. for a period of 30 minutes. All of the prior art adhesive tapes are not adapted to such sterilizing conditions for one reason or another. In the case of the cellulose nitrate coatings on adhesive tape the cellulose nitrate is not sufficiently stable under these conditions of sterilization. It is well known that at any given temperature the rate of deterioration of cellulose nitrate is much greater in a moist atmosphere than in a dry one.

The cellulose acetate type of coating for adhesive tape backing described in U. S. Patent 1,877,344 is also an improvement over the untreated fabric having only a pressure-sensitive rubber adhesive film on one side, but it too is not adapted to be subjected to sterilizing conditions since the commercially available plasticizers for cellulose acetate tend to be driven out of the coating when heated with steam under the sterilizing conditions and the cellulose acetate film becomes stiffened with the loss of plasticizer.

This invention has as an object the provision of a substantially cleanable, non-soiling, sterilizable backing material for adhesive tape or surgical plaster.

A further object is the provision of a plasticized cellulose ether coating which will not become stiffened during conditions necessary for sterilization.

A still further object is the provision of a cellulose ether coating for adhesive tape backing which will not decompose under conditions necessary to render the adhesive tape sterile.

A still further object is the provision of a plasticized cellulose ether coating for adhesive tape backing, the plasticizer component of which will not be volatilized or chemically changed during sterilizing conditions.

A still further object is the provision of a pigmented and plasticized cellulose ether coating which will withstand conditions necessary for sterilization and will firmly anchor to the surface of fabric sheet or web.

A still further object is the provision of a pigmented and plasticized cellulose ether coating which will take an embossed design and which will not flow sufficiently to obliterate the design under conditions necessary for sterilization. Other objects will be apparent hereinafter.

The objectives of this invention are accomplished by applying to one side of a woven or nonwoven flexible base material a suitable cleanable, non-soiling, sterilizable coating containing a cellulose ether as the main film forming ingredient, pigment, and plasticizer, and applying to the opposite side of the base material suitable pressure-sensitive rubber adhesive composition.

In the drawing the single figure represents a cross-section of a portion of the material prepared according to the present invention. In this figure, 1 represents the base fabric, 2 indicates a cellulose ether coating, and 3 represents a conventional pressure-sensitive rubber composition.

The invention is best illustrated by a description of the preferred embodiment, but it is to be understood that the invention is not limited thereto except as defined in the appended claims.

EXAMPLE I

A plain weave cotton fabric weighing approximately 3.78 ounces per lineal yard 40 inches wide and having a thread count of warp 80, filler 80 which has been bleached by any conventional method well known in the art of bleaching fabrics, was made water-repellent in accordance with the disclosure in U. S. Patent 2,118,101, issued May 24, 1938, which comprises passing the fabric through a dye jig which contains a water-repellent composition. A composition which has been found satisfactory contains about 75 gallons of water and 25 pounds of an emulsion of a wax in an aqueous solution of a salt of a carbohydrate amine polymer which is soluble in dilute aqueous organic acids but insoluble in water as disclosed in U. S. Patent 2,047,217 issued July 14, 1936. An example of such a carbohydrate amine polymer is an acetate of deacetylated chitin. While the water-repellent treatment is preferred, it is not essential.

The fabric was passed three times through the water-repellent bath and the wet material dried by passing through a tenter frame enclosed in a heated chamber, and kept to a dry width of 40 inches. This water-repellent treatment was applied to the fabric to retard wicking particularly at the edges of the adhesive tape when later exposed to moisture, water or other liquids. The fabric after being subjected to the above treatment was quite water-repellent whereas before treatment it readily absorbs water in very much the same fashion as a blotting paper. The water-repellent treatment described above forms no part of this invention per se.

After the fabric was rendered water-repellent in the manner described above, there was applied to one face thereof by means of a doctor knife a plurality of coats of coating composition A comprising:

Coating composition A

| | Per cent by weight |
|---|---|
| Ethyl cellulose solution | 29.6 |
| Mill base | 70.4 |

The ethyl cellulose solution in coating composition A prepared by dispersing ethyl cellulose in a solvent mixture in the following proportion:

Ethyl cellulose solution

| | Per cent by weight |
|---|---|
| Ethyl cellulose | 14.8 |
| Toluol | 34.1 |
| 99% ethyl acetate | 42.6 |
| 95% ethyl alcohol | 8.5 |

The ethyl cellulose and solvent mixture were subjected to a mixing operation for approximately 3 to 5 hours in suitable mixing equipment. The ethyl cellulose employed was that known to the trade as Hercules Ethyl Cellulose B—extra extra high viscosity.

The mill base in the coating composition A was prepared by grinding together the following ingredients in the proportions indicated:

Mill base for coating composition A

| | Per cent by weight |
|---|---|
| Titanium dioxide (barium base) | 50.00 |
| Synthetic resin plasticizer solution | 20.85 |
| 14.8% ethyl cellulose solution (described above) | 9.72 |
| Toluol | 7.77 |
| 99% ethyl acetate | 9.72 |
| 95% ethyl alcohol | 1.94 |

The synthetic resin solution in the above mill base formula consisted of a 60% solution of a castor oil modified polyhydric alcohol straight chain dibasic acid resinous product, the dispersing medium being toluol. The mill base ingredients were subjected to a grinding operation in a ball mill for approximately 6 to 8 hours.

A detailed breakdown of the coating composition A is given below and the numbers in parenthesis indicate the percentages of the non-volatile ingredients after the volatile solvents have been expelled.

Breakdown of coating composition A

| | Per cent by weight | |
|---|---|---|
| Ethyl cellulose | 5.4 | (10.9% by wt.) |
| Titanium dioxide (barium base) | 35.29 | (71.3% by wt.) |
| Synthetic resin plasticizer (dry) | 8.8 | (17.8% by wt.) |
| Toluol | 23.8 | |
| 99% ethyl acetate | 22.3 | |
| Ethyl alcohol | 4.5 | |

The coating composition was applied as noted above in a plurality of coats by passing the water-repellent fabric under a doctor knife with the coating composition in the form of a roll immediately in front of the knife. Sufficient composition was applied to deposit approximately 3.0 wet ounces per linear yard 40 inches wide, which corresponds to approximately 1.5 dry ounces per linear yard 40 inches wide.

The material was dried after each successive coat by passing through a heated chamber to expel the volatile solvents. After this final coat has been applied and suitably dried, the material was passed through an embossing apparatus to emboss a pattern on the coating surface. The purpose of the embossing operation is twofold; first, to enhance the appearance, and second, to improve the bond of the coating to the base fabric. In the embossing operation one of the embossing elements was a heated steel engraved roll and the other was a paper roll carrying a design counter to the steel roll. Embossing plates may also be used in which case an engraved heated steel plate is pressed against the coated fabric supported by a fibrous embossing bed. During the embossing operation a pressure of approximately 40 to 50 tons was applied to the axis of the heated steel roll to force it against the paper counter roll. The temperature of the steel roll was approximately 300° F.

It is sometimes desirable to treat the embossed material to restore the fibers of the base fabric to their condition prior to the embossing operation in order to prepare the uncoated side of the fabric for the application of the rubber pressure-sensitive adhesive mass. This may be accomplished by the method set forth in U. S. Patent 2,137,969 issued November 22, 1938, wherein the embossed fabric is subjected to an aqueous treatment followed by drying under suitable conditions, for example, a tenter frame. The aqueous treatment of the coated fabric after embossing is disclosed and claimed in the aforementioned U. S. Patent 2,137,969 and forms no part of this invention per se.

To the uncoated side of the material thus prepared was applied by spreading a suitable quantity of a conventional pressure-sensitive rubber adhesive mass by any desired method of application. Suitable compositions for the pressure-sensitive adhesive mass are disclosed in U. S. Patent 2,137,969. Other examples of such compositions and their mode of application are also disclosed in "The Chemical Formulary" by Bennett, volume 2, page 366, D. Van Nostrand Co.. New York (1935) and "The Pharmacopoeia of the United States of America"—eleventh decennial revision, Mack Printing Co., Easton, Pa. (1936).

Following the application of the pressure-sensitive rubber adhesive mass, the material was cut into narrow strips of short lengths approximately ¾ inch wide and approximately three inches long. A small piece of gauze approximately ¾ inch wide and one inch long was then adhered to the center of the cut strip and two pieces of crinoline fabric are then applied over the uncovered pressure-sensitive rubber adhesive mass. The material was then placed in a suitable individual container and sealed. The sealed container must withstand the sterilizing conditions and allow the steam to penetrate the container in order to sterilize the enclosed adhesive tape material. An example of a suitable container is made from a glassine type of paper.

The sealed package containing the adhesive plaster was then subjected to an atmosphere of steam for 30 minutes at a temperature of 240° F. The material was then suitably packaged and stored.

EXAMPLE II

A sterilizable adhesive tape material was produced in accordance with the disclosure given above in Example I, except the following cellulose ether composition was employed:

*Coating composition B*

| | Per cent by weight |
|---|---|
| Benzyl cellulose solution | 25.63 |
| Mill base | 74.37 |

The benzyl cellulose solution was prepared by dispersing benzyl cellulose in ethyl acetate in the following proportion:

*Benzyl cellulose solution*

| | Per cent by weight |
|---|---|
| Benzyl cellulose | 20.68 |
| Ethyl acetate | 79.32 |

The mill base in coating composition B was prepared by grinding together the following ingredients in the proportions indicated:

*Mill base for coating composition B*

| | Per cent by weight |
|---|---|
| Titanium dioxide (barium base) | 57.14 |
| Butyl phthalyl butyl glycollate | 14.29 |
| 5% solution of benzyl cellulose in ethyl acetate | 28.57 |

A detailed breakdown of coating composition B is given below and the numbers in parenthesis indicate the percentages of the non-volatile ingredients after the volatile solvents have been expelled.

*Breakdown of coating composition B*

| | Per cent by weight | |
|---|---|---|
| Benzyl cellulose | 6.36 | (10.69% by weight) |
| Titanium dioxide (barium base) | 42.50 | (71.45% by weight) |
| Butyl phthalyl butyl glycollate | 10.63 | (17.86% by weight) |
| Ethyl acetate | 40.51 | |

In applying the cellulose ether coating compositions to the fabric which has previously been subjected to the water-repellent treatment, a precaution to be observed is to avoid having the composition penetrate the interstices of the fabric so as to come through on the opposite side. The composition is to be deposited on the surface of the fabric rather than applied in such a manner to drive the coating through to the opposite side of the fabric. If the coating penetrates through the back of the fabric, difficulty will later be experienced in uniformly spreading the pressure-sensitive rubber adhesive mass.

It has been found necessary to use a relatively hot steel roll during the embossing operation in order to effect a satisfactory bond of this ethyl cellulose composition to the base fabric. The ethyl cellulose being of a thermoplastic character tends to flow when subjected to temperatures necessary for embossing and sterilizing and the embossed design is obliterated to a certain extent unless the coating composition contains a sufficient quantity of pigment (much greater than that normally employed in coating compositions applied to fabrics) to retard the tendency of the coating to flow.

It will be observed that the coating composition A on a dry basis (after solvents have been expelled) contains a very high percentage of pigment, for each one part of dry ethyl cellulose there are 1.6 parts plasticizer and 6.5 parts of pigment.

Compositions similar to the above containing very little or no volatile solvent may also be prepared by kneading the cellulose ether and plasticizer in a suitable mixing machine such as a Werner and Pfleiderer or Banbury mixer until a homogeneous colloid is obtained. To this colloid, comprising the cellulose ether and plasticizer, is added a small amount of a lubricant which is practically incompatible with the cellulose ether composition, such as oleic acid, methyl and ethyl stearate, cocoanut oil, white oil, etc. This composition is then mixed with the pigment on milling rolls. Such compositions are suitable for application to flexible base materials by means of calender rolls.

The invention is not limited to the particular fabric mentioned in the preferred embodiment. In place of the plain or sheeting weave, having a yarn count of warp 80 and filler 80, other fabrics, for example, felt, broadcloth fabrics, or the like may be used; while plain weave fabrics are preferred, special weave fabrics such as pajama check, have definite advantages under certain conditions. The choice of fabric used, whether woven or unwoven, is determined largely by the use to which the material is to be put, and it may be readily selected by those skilled in the art. Certain types of paper may be advantageously treated by the process described above.

The invention is not limited to any particular type of cellulose ethers. Ethyl cellulose or benzyl cellulose having a wide range of viscosity characteristics have been found useful as long as a suitable coating viscosity is obtained. Mixtures of ethyl and benzyl cellulose may also be used. Other water-insoluble cellulose ethers are satisfactory but are not available in commercial quantities at present.

While there are several known plasticizers for cellulose ethers, only those which will not be driven from the coating during the sterilizing conditions are suitable for use in practicing the present invention. While the resin type of plasticizers is preferred, due to their high vapor pressure, the solvent type of plasticizer may also be used. The vapor pressure of the plasticizer is not the only factor which controls the permanency of the pliability of the cellulose ether film after sterilization. Those plasticizers which have a natural affinity for cellulose ether and are not driven out of the coating during the sterilization conditions may be used irrespective of the vapor pressure of the plasticizer. Other examples of plasticizers or mixtures thereof which may be used with the cellulose ether with varying degrees of success are phthalic di-ester of monomethyl ether of ethylene glycol, phthalic di-ester of monobutyl ether of ethylene glycol dibutyl phthalate, tricresyl phosphate, dicresyl ether of diethylene glycol, actyl laevinulate, mixtures of ortho and para toluene ethyl sulfonamides and butyl phthalyl butyl glycollate. The plasticizer must be innocuous to the rubber adhesive mass.

Other white pigments than titanium dioxide (barium base) such as, e. g., titanium dioxide (calcium base), lithopone and zinc oxide may be used with satisfactory results. Colored pigments, such as chrome yellow, chrome green, red oxide, ultramarine blue, etc., may be used alone or mixed to produce solid colors or used in conjunction with white pigments to produce tints if desired. Fillers may also be used, such as, e. g., china clay, diatomaceous earth, mica, barytes, etc., for blending with other pigments. The choice of pigments depends upon the desired color of waterproof coating. Pigments which contain copper or manganese are ordinarily to be avoided since these elements have a deleterious effect on the rubber in the pressure-sensitive adhesive.

It is to be understood that as far as pigments and fillers are concerned, either one may be used at the expense of the other to obtain the desired degree of flow resistance under the sterilizing treatment described above. It will be apparent from the description of the invention that it is essential to have sufficient pigment or filler so that there will be no migration of the cellulose ether composition through the fabric when subjected to steam during sterilization.

The solvent or dispersing medium used in preparing the cleanable coating composition may vary according to practices well known in the art. Because of the character of the product made by this invention, very pure materials, especially free from impurities, are preferable, so as to guard against the introduction of any impurities which might have a deleterious action on the adhesive rubber mass.

It is sometimes found desirable to apply a coat of cellulose derivative composition as the final surface coat prior to the embossing operation, to obtain an exceptionally dry velvety surface. A suitable composition for the surface comprises a mixture of ethyl cellulose and cellulose acetate. The following composition was found suitable for application as the surface coat:

*Coating composition C*

| | Percent by weight |
|---|---|
| Ethyl cellulose | 4.2 |
| Cellulose acetate | 4.2 |
| 99% ethyl acetate | 71.7 |
| 95% ethyl alcohol | 4.0 |
| Acetone | 6.3 |
| Toluene | 9.6 |

Approximately 1.0 wet ounce of the above composition was applied per linear yard 40 inches wide, over the plasticized pigmented composition. The ethyl cellulose-cellulose acetate composition had a smooth milky white appearance and was easily spread. The coated fabric had a smooth velvety dry surface.

The ethyl cellulose in the coating composition C was the same as that used in the coating compositions A and B. The cellulose acetate in the coating composition C had a combined acetic acid content of 54.5 to 55.5% and the viscosity characteristic of a 20% solution in acetone was 2-6 seconds (A. S. T. M.).

The percentage of the non-volatile ingredients may vary over a rather wide range without departing from the scope of this invention. The following table indicates three different compositions which show the range of non-volatile components which may be tolerated and yet obtain the advantages which accrue from this invention:

| | #1 | #2 | #3 |
|---|---|---|---|
| | Per cent | Per cent | Per cent |
| Cellulose ether | 16.6 | 10.0 | 10.0 |
| Pigment or filler | 50.0 | 64.0 | 74.0 |
| Plasticizer | 33.4 | 26.0 | 16.0 |

From the above table it will be observed that the pigment may vary from 3.0 parts to 7.4 parts for each part of cellulose ether and the plasticizer may vary from 1.6 parts to 2.6 parts for each part of cellulose ether. Such compositions are called highly pigmented in the claims.

The product of this invention finds particular use as medical and surgical adhesive tape and plaster where a sterile waterproof, non-soiling and washable material is desirable and necessary. Because of the desirable properties possessed by the product, other uses will readily be suggested by those skilled in the art of such products.

It will also be apparent that essences for giving the tape an odor may be added, and also it is within the scope of the invention to add antiseptics such as phenol, methyl, salicylate, etc., if desired, provided they do not have an adverse effect on the rubber mass or the ether composition.

The primary advantage of the invention is the provision of a sterile cleanable adhesive tape or plaster which can be cleaned by washing if such cleaning becomes necessary.

Another advantage is the provision of a cleanable coating which will not become stiffened under conditions necessary for sterilization.

A still further advantage is the provision of a cleanable coating which will hold an embossed design after being subjected to conditions necessary for sterilization.

A still further advantage is the provision of a flexible cleanable coating, the flexibility of which will not be materially altered during sterilization treatment and said coating being innocuous to the pressure-sensitive rubber adhesive mass.

It is apparent that many widely different embodiments of this invention may be made without departing from the spirit and scope thereof; and, therefore, it is not intended to be limited except as indicated in the appended claims.

We claim:

1. A sterilizable surgical adhesive tape comprising a flexible base having a pressure-sensitive rubber adhesive firmly attached to one side and a highly pigmented plasticized cellulose ether composition firmly attached on the other side, the pigment content of the cellulose ether composition being within the range of about 50.0% to 74.0% of the total non-volatile components of a composition.

2. A sterilizable surgical adhesive tape comprising a fabric base having a pressure-sensitive rubber adhesive firmly attached to one side and a highly pigmented plasticized, ethyl cellulose composition firmly attached to the other side, the pigment content of the cellulose ether composition being within the range of about 50.0% to 74.0% of the total non-volatile components of a composition.

3. A sterilizable surgical adhesive tape comprising a fabric base having a pressure-sensitive rubber adhesive firmly attached thereto and attached to the opposite side an ethyl cellulose composition comprising a pigmenting agent and a plasticizing agent therefor, said pigmenting agent being present in amounts from 3.0 to 7.4 parts to each part of ethyl cellulose and the said plasticizing agent being present in amounts from 1.6 to 2.6 parts to each part of ethyl cellulose.

4. A sterilizable surgical adhesive tape comprising a fabric base having on one side a pressure-sensitive rubber adhesive firmly attached thereto and a plasticized, pigmented, benzyl cellulose composition firmly attached to the other side, the pigment content of the cellulose ether composition being within the range of about 50.0% to 74.0% of the total non-volatile components of a composition.

5. Process of preparing a sterilizable surgical adhesive tape which comprises coating one side of a fabric with a composition having approximately the following composition:

| | Per cent by weight |
|---|---|
| Ethyl cellulose | 5.4 |
| Titanium dioxide (barium base) | 35.2 |
| Plasticizer | 8.8 |
| Toluol | 23.8 |
| 99% ethyl acetate | 22.3 |
| 95% ethyl alcohol | 4.5 | removing the volatile solvents by passing through a heated chamber, passing the dry material between heated embossing rolls, and applying a pressure-sensitive rubber adhesive mass on the uncoated side, said adhesive tape being adapted for sterilization by subjecting it to an atmosphere of steam at a temperature of 240° F. for a period of 30 minutes.

6. Process of producing sterilizable surgical adhesive tape which comprises coating one side of a fabric with a composition having approximately the following composition:

| | Per cent by weight |
|---|---|
| Ethyl cellulose | 5.4 |
| Titanium dioxide (barium base) | 35.2 |
| Plasticizer | 8.8 |
| Toluol | 23.8 |
| 99% ethyl acetate | 22.3 |
| 95% ethyl alcohol | 4.5 | removing the volatile solvents by passing through a heated chamber, applying a second coating composition over the first mentioned composition, said second composition having approximately the following composition:

| | Per cent by weight |
|---|---|
| Ethyl cellulose | 4.2 |
| Cellulose acetate | 4.2 |
| 99% ethyl acetate | 71.7 |
| 95% ethyl alcohol | 4.0 |
| Acetone | 6.3 |
| Toluene | 9.6 | removing the volatile solvents by passing through a heated chamber, passing the dry material between heated embossing rolls, and applying a pressure-sensitive rubber adhesive mass on the uncoated side, said adhesive tape being adapted for sterilization by subjecting it to an atmosphere of steam at a temperature of 240° F. for a period of 30 minutes.

ALVA W. BATEMAN.
RAYMOND E. THOMAS.

CERTIFICATE OF CORRECTION.

Patent No. 2,241,384. May 13, 1941.

ALVA W. BATEMAN, ET AL.

It is hereby certified that error appears in the printed specification of the above numbered patent requiring correction as follows: Page 3, second column, line 61, after "glycol" insert a comma; page 4, second column, line 18, strike out the comma after "methyl"; and that the said Letters Patent should be read with this correction therein that the same may conform to the record of the case in the Patent Office.

Signed and sealed this 24th day of June, A. D. 1941.

(Seal)

Henry Van Arsdale,
Acting Commissioner of Patents.